May 20, 1958     D. I. REITER     2,835,012
FASTENER FOR FLEXIBLE ELEMENTS
Filed May 4, 1954
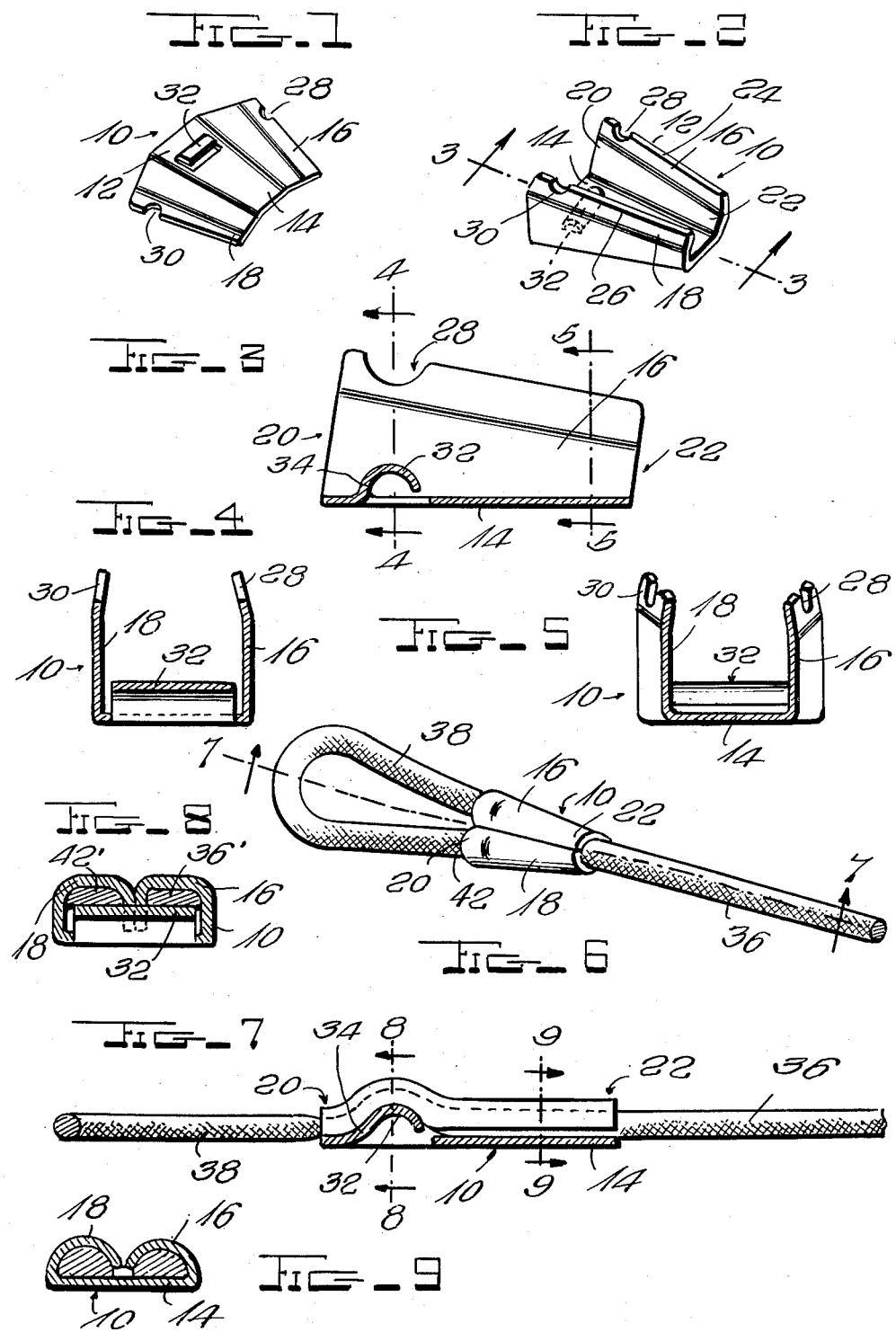

United States Patent Office 2,835,012
Patented May 20, 1958

2,835,012
FASTENER FOR FLEXIBLE ELEMENTS
Daniel I. Reiter, New York, N. Y.
Application May 4, 1954, Serial No. 427,417
2 Claims. (Cl. 24—129)

This invention appertains to fasteners and is particularly directed to a fastening clamp or clip that is constructed and designed to hold flexible elements tightly together in side by side relationship.

A primary object of the invention is to provide a fastening clip which receives a pair of flexible elements in side by side relationship and holds them together against lateral movement and relative axial displacement. For example, such flexible elements may be constituted by a length of material and an end thereof, the end being bent back on the material to form a loop and such end being attached to the material by the fastening clip of this invention. The invention finds application particularly, though not exclusively, in the construction of a leash for a dog. Such leashes are conventionally formed with a loop at one end that carries a connector which attaches the leash to a collar or harness on the dog. The loop is subjected to considerable strain as the dog pulls on the leash and it is also subject to strong pressures and pulls tending to cause the end to pull loose and destroy the loop which results in disconnecting of the leash from the dog.

To secure such end, or other sections of similar articles in loop formation in a secure manner so that they cannot pull loose is the primary aim and purpose of this invention.

The invention contemplates the provision of a U-shaped body member which includes arms that are adapted to be bent or rolled down onto the main part of the leash and the end to clamp such pieces on the bottom wall of the body member. A means is formed on the bottom wall for providing a wedging force that blocks the withdrawal of the end under any axial pull that a dog can exert thereon.

The invention further contemplates the provision of an upstanding transversely extending ridge on the bottom wall, which ridge cooperates with the clamping force of the arms to flatten out the main part of the leash and the end thereof and to interfere with an axial pull on the end by imposing such wedging restriction in the path of such pull.

The invention additionally contemplates the formation of an upstruck or obstructing ridge on the bottom wall which induces a bend on the main part of the leash and the end thereof so as to provide a restriction, not only by flattening out the material in consort with the pressure of the arms that is, by forming a backing surface for such pressure, but also by serving as an obstruction in the direction of axial pull on the leash.

A further object of the invention is to provide an extremely simple, one-piece inexpensive clip or connector, which can be easily attached to the material forming the leash and which, without any skill, can be attached to the leash in a matter of seconds, thereby reducing the cost of labor and materials involved in the construction of a dependable and strong, resistant leash.

The foregoing and ancillary objects are attained by this invention, the preferred embodiment of which is set forth in the following description and illustrated in the accompanying drawing wherein:

Figure 1 is a view in perspective of the clip or connector in blank form;

Figure 2 is a view in perspective of the clip or connector ready for attachment to the leash in forming the loop at the end thereof or for attachment to any other article in holding a pair of flexible elements in side by side relationship or connected relationship;

Figure 3 is a longitudinal sectional view taken substantially on line 3—3 of Figure 2;

Figure 4 is a transverse sectional view taken on line 4—4 of Figure 3.

Figure 5 is a transverse section view taken on line 5—5 of Figure 3.

Figure 6 is a view in perspective of the clip or connector shown attached to the leash in forming the loop at the end thereof;

Figure 7 is a longitudinal sectional view taken on line 7—7 of Figure 6.

Figure 8 is a cross-sectional view taken on line 8—8 of Figure 7, and

Figure 9 is a cross-sectional view taken on line 9—9 of Figure 7.

Referring now more particularly to the drawing, the numeral 10 generally designates a fastening clip or connector, which is formed from sheet metal or similar inexpensive but strong and long lasting material. The fastening clip or connector 10 includes a body portion 12, which is formed from the material by being stamped out of the material in blank form as shown in Figure 1. The body portion is U-shaped in cross-section and includes a flat bottom wall 14 from the opposing side edges of which arms 16 and 18 upstand, in the final form of the clip, that is prior to its application to the leash.

In the blank form, the arms 16 and 18 are co-planar with the body portion and are bent upwardly at right angles thereto to achieve the final form shown in Figure 2.

The bottom wall 14 tapers rearwardly and the side walls 16 and 18 also have their free edges in the blank form tapered rearwardly, so that when the arms are bent upwardly, the arms converge rearwardly. The clip therefore is wider at the front end 20 than at its rear end 22. Also, in addition to the horizontal rearward convergence of the clip due to the tapering of the side edges of the bottom wall 14, the clip has a vertical convergence, resulting from the declination of the free edges of the arms 16 and 18 so that the clip is greater in height at the front end 20 than at the rear end 22. The front end is therefore wider and higher than the rear end 22.

In stamping out the blank of Figure 1, the free side edges of the arms 16 and 18 which form the free upper edges 24 and 26 of the arms in their final form are formed adjacent their forward ends with semi-circular recesses or grooves 28 and 30, for a purpose to be described.

In addition, the bottom wall 14 of the clip is formed in the blank form thereof with an upstruck ridge 32 which is disposed transversely thereof just rearwardly of the front edge thereof. The ridge 32 is formed by pressing the material out of the bottom wall, the material being pressed or struck upwardly to form the integral ridge. It is to be particularly stressed that the material of the clip is inherently resilient and that the ridge 32, in its manner of being pressed out of the bottom wall, possesses inherent resiliency. It is preferred that the ridge be rounded in cross-section as shown in Figure 3 so that the surface thereof is curved and free from sharp edges or any rough points. The surface is smooth as shown.

The ridge is positioned transversely of the longitudinal axis of the bottom wall and is disposed in alignment, laterally of the clip, with the recesses 28 and 30 for a purpose to be described in the consideration of the attachment of the clip to the article.

The ridge 32 is attached only at its forward side edge 34 to the bottom wall and the other side edge is free as are the end edges.

Considering the application of the clip to the leash 36 of Figures 6–9, it is to be understood that the purpose of the clip is to form the loop end 38 on the leash. Such end conventionally carries a fastening member which attaches the leash to the collar or harness of a dog. The loop end 38 is formed by bending the end 42 of the leash 36 back on to the main part of the leash. The leash may be formed from any suitable material but is usually formed from leather, plastic, cord or like flexible material. In forming the loop 38 the end 42 of the leash is bent rearwardly and such end and the main part of the leash are inserted in the clip, resting axially on the bottom wall 14.

The arms 16 and 18, as shown in Figure 4, have their free ends 24 and 26 slightly angled inwardly at an obtuse angle to the main portions thereof. The purpose of the pre-bent ends 24 and 26 is to facilitate the bending or rolling of the arms, under the action of a forming tool, in securing the clip to the end and main part of the leash. Therefore after the end and main part are placed side by side on the bottom wall 14, the arms 16 and 18 are rolled inwardly and downwardly onto the end and main part of the leash. The recesses 28 and 30 receive the ends of the ridge 32, so as to permit the arms to reach their final position, exerting a compressive force on the parts of the leash. The portions 42' and 36' of the parts of the leash as shown in Figure 8 are flattened by the arms on and over the ridge 32. Such deformation of the parts of the leash causes the parts to spread horizontally and to be tightly wedged by the clamping force of the arms onto the ridge. In addition, the clamping force of the arms on the portions of the parts of the leash fore and after the ridge causes such parts to be tightly pressed on the bottom wall, as shown in Figure 7. Therefore, the ridge upstands from the bottom wall and forms a hump on the parts of leash. The portion of the end of the leash, rearward of the ridge 32, has to pass over the ridge in being pulled axially out of the clip. However, due to the deflection of the parts of the leash by the ridge the end is unable to be pulled axially and to pass over the ridge. Furthermore, due to the flattening of the portions of the end and the portion of the main part of the leash that are wrapped over the ridge, the end is unable to move axially over such ridge even under considerable axial strain and pull.

Of course, the size of the clip would be dependent upon the size of the leash that is, whether the leash is to be used for a little dog or a big dog and, in the event that a rather large clip was used, it would be preferred to provide more than one ridge 32.

It is to be noted that the inherent resiliency of the ridge 32 permits a slight deflection thereof by the recesses 30 and 28 which is necessary in order to effect a complete closing of the arms 16 and 18. Obviously, the tendency of the ridge, due to its construction is to urge the overlying portions of the parts of the leash upwardly resisting the compressive force of the arms 16 and 18, such action resulting in an extremely tight clamping grip by the ridge and the arms on the portions of the parts of the leash.

While the fastening clip has been illustrated and described in connection with a leash to form the loop end thereof it is to be understood that such is merely illustrative in nature and not restrictive since the fastening clip can be used to great advantage and give the same result of a secure and dependable connection with other articles, for example, in connection with pocketbook handles or the like.

Accordingly, while the best-known form of the invention has been illustrated and described, it is to be understood that other forms may be realized as come within the purview of the appended claims.

What is claimed is:

1. A one-piece sheet metal clamp for securing a pair of side by side flexible elements of circular cross-sectional form together against relative lateral and axial movement, said clamp comprising a channel shaped body member having a bottom wall, said bottom wall being tapered toward one end and having opposing convergent side edges, a pair of arms perpendicularly extending in confronting relation from the side edges and being spaced apart sufficiently to receive the flexible elements axially therebetween, said arms converging toward said end of the bottom wall and being vertically tapered toward said end and having offset outer free ends which are turned inwardly toward each other and arranged at an obtuse angle to the arms, and a spring ridge integrally formed on the bottom wall and being upstruck therefrom and extending transversely between the arms, said ridge having a free side edge and free end edges and exerting an upward bias and having a rounded smooth top portion over which the elements are passed and which are biased upwardly thereby and said free ends of the arms having semi-circular recesses formed in their edges in lateral alignment with the ridge and adapted to receive the ridge when the arms are bent inwardly and downwardly onto the elements to clamp them on the bottom wall.

2. A clamp as claimed in claim 1, wherein said ridge is formed adjacent the wider end of the bottom wall and extends substantially the entire width of the bottom wall.

References Cited in the file of this patent

UNITED STATES PATENTS

| | | |
|---|---|---|
| 1,217,107 | Prentice | Feb. 20, 1917 |
| 2,104,786 | Andre | Jan. 11, 1938 |
| 2,296,084 | Bloom | Sept. 15, 1942 |